(12) United States Patent
Kitamura et al.

(10) Patent No.: US 7,444,999 B2
(45) Date of Patent: Nov. 4, 2008

(54) CONTROL SYSTEM AND METHOD FOR INTERNAL COMBUSTION ENGINE

(75) Inventors: Toru Kitamura, Saitama-ken (JP); Ken Ogawa, Saitama-ken (JP); Toshinari Shinohara, Saitama-ken (JP); Chiho Itoga, Saitama-ken (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/980,957

(22) Filed: Oct. 31, 2007

(65) Prior Publication Data

US 2008/0110422 A1 May 15, 2008

(30) Foreign Application Priority Data

Nov. 14, 2006 (JP) ............................. 2006-307695

(51) Int. Cl.
*F02M 25/07* (2006.01)
*F02B 47/08* (2006.01)

(52) U.S. Cl. ............................. 123/568.11; 123/568.22

(58) Field of Classification Search ............ 123/568.11, 123/568.12, 568.14, 568.21, 568.22, 406.55, 123/27 R See application file for complete search history.

(56) References Cited

U.S. PATENT DOCUMENTS

| | | | |
|---|---|---|---|
| 6,848,435 B2 * | 2/2005 | Kitamura et al. | 123/568.31 |
| 2004/0250803 A1 * | 12/2004 | Kitamura et al. | 123/568.31 |
| 2007/0089697 A1 * | 4/2007 | Hara et al. | 123/90.15 |
| 2007/0215095 A1 * | 9/2007 | Kakuya et al. | 123/295 |

* cited by examiner

*Primary Examiner*—John T Kwon
(74) *Attorney, Agent, or Firm*—Lahive & Cockfield, LLP; Anthony A. Laurentano, Esq.

(57) ABSTRACT

A control system for an internal combustion engine, which is capable of positively preventing a misfire or knocking during a compression ignition combustion mode by switching from the compression ignition combustion mode to a spark ignition combustion mode in appropriate timing. The engine is operated while switching between the compression ignition and spark ignition combustion modes. The control system (ECU) sets a target operating gas temperature to which the temperature of operating gases in a combustion chamber is to be controlled in the compression ignition combustion mode, sets a target internal EGR amount to which the internal EGR amount is to be controlled, such that the temperature of operating gases in the combustion chamber becomes equal to the target operating gas temperature, and switches the combustion mode to the spark ignition combustion mode depending on the target internal EGR amount.

4 Claims, 10 Drawing Sheets

CRANK ANGLE

FIG. 12

CONTROL SYSTEM AND METHOD FOR INTERNAL COMBUSTION ENGINE

BACKGROUND OF THE INVENTION

1. Field of the Invention

The present invention relates to a control system and method for an internal combustion engine that is operated while switching a combustion mode between a compression ignition combustion mode in which a mixture supplied to a combustion chamber is burned by compression ignition, and a spark ignition combustion mode in which the mixture is burned by spark ignition.

2. Description of the Related Art

Conventionally, there has been proposed a control system disclosed in Japanese Laid-Open Patent Publication (Kokai) No. 2000-257467, in which an operating state of an internal combustion engine is determined based on the rotational speed of the engine and demanded torque, and if it is determined the engine is in a low-to-medium load operating state, combustion in a compression ignition combustion mode is executed, whereas if the engine in the other operating state, combustion in a spark ignition combustion mode is executed.

The higher the temperature of operating gases before the start of the compression stroke, including an air-fuel mixture and EGR gases present in the combustion chamber, the earlier the timing of combustion ignition in the compression ignition combustion. However, in the conventional control system, insofar as the engine is in a low-to-medium load operating state, the compression ignition combustion mode is selected, and hence if the temperature of operating gases is too low during the compression ignition combustion mode, the timing of compression ignition becomes so late that the combustion becomes unstable, which can cause a misfire. Inversely, if the temperature of operating gases is too high, ignition tends to become so early that knocking can occur.

SUMMARY OF THE INVENTION

The present invention has been made in view of the above problems, and an object of the invention is to provide a control system for an internal combustion engine, which is capable of positively preventing a misfire or knocking during a compression ignition combustion mode by performing switching of the combustion mode from the compression ignition combustion mode to a spark ignition combustion mode in appropriate timing.

To attain the above object, in a first aspect of the present invention, there is provided a control system for an internal combustion engine which is operated while switching a combustion mode thereof between a compression ignition combustion mode in which an air-fuel mixture supplied to a combustion chamber is burned by compression ignition, and a spark ignition combustion mode in which the air-fuel mixture is burned by spark ignition, comprising internal EGR control means for controlling an internal EGR amount of combustion gases caused to remain in the combustion chamber, target operating gas temperature-setting means for setting a target operating gas temperature as a target to which the temperature of operating gases in the combustion chamber is to be controlled in the compression ignition combustion mode, target internal EGR amount-setting means for setting a target internal EGR amount as a target to which the internal EGR amount is to be controlled, such that the temperature of operating gases in the combustion chamber becomes equal to the target operating gas temperature in the compression ignition combustion mode, and combustion mode-switching means for switching the combustion mode to the spark ignition combustion mode depending on the target internal EGR amount.

With the configuration of the control system according to the first aspect of the present invention, the engine is operated while switching the combustion mode between the compression ignition combustion mode and the spark ignition combustion mode. Further, the internal EGR amount of combustion gases caused to remain in a combustion chamber is controlled by the internal EGR control means, and according to the internal EGR amount, the temperature of operating gases before the start of the compression stroke changes (hereinafter simply referred to as "operating gases"), including an air-fuel mixture and EGR gases present in the combustion chamber. In the compression ignition combustion mode, a target operating gas temperature is set, and a target internal EGR amount is set such that the temperature of operating gases in the combustion chamber becomes equal to the target operating gas temperature. Further, depending on the target internal EGR amount, the combustion mode is witched to the spark ignition combustion mode.

As described above, according to the first aspect of the present invention, during the compression ignition combustion mode, the target internal EGR amount is set such that the temperature of operating gases in the combustion chamber becomes equal to the target operating gas temperature, and hence the target internal EGR amount indicates whether or not the actual temperature of operating gases is higher or lower than the target operating gas temperature and a degree of difference of the actual temperature of operating gases from the target operating gas temperature. For example, if the set target internal EGR amount is too large, it implies that the actual temperature of operating gases is too low compared with the target operating gas temperature, causing delay in the timing of the compression ignition, which can make the combustion unstable, and hence, the combustion mode is switched to the spark ignition combustion mode, whereby it is possible to prevent occurrence of a misfire, which would occur if the compression combustion mode is continued. This makes it possible to ensure stable combustion.

On the other hand, if the target internal EGR amount is too small, it implies that the actual temperature of operating gases is too high compared with the target operating gas temperature, so that early ignition tends to occur, which also makes the combustion unstable. To avoid this inconvenience, the combustion mode is switched to the spark ignition combustion mode, whereby it is possible to prevent occurrence of knocking, which would occur if the compression combustion mode was continued. As described above, it is possible to execute switching of the combustion mode to the spark ignition combustion mode in appropriate timing depending on the target internal EGR amount, whereby it is possible to positively prevent a misfire and knocking during the compression ignition combustion mode.

Preferably, the control system further comprises external EGR control means for controlling an external EGR amount of exhaust gases exhausted from the combustion chamber and caused to return to an intake system of the engine, operating condition-detecting means for detecting an operating condition of the engine, and target total EGR amount-setting means for setting a target total EGR amount serving as a target to which a total EGR amount as a sum of the internal EGR amount and the external EGR amount is to be controlled, according to the detected operating condition of the engine, wherein the combustion mode-switching means switches the combustion mode to the spark ignition combustion mode when the target internal EGR amount takes a negative value or is larger than the target total EGR amount.

With the configuration of this preferred embodiment, during the compression ignition combustion mode, when the target internal EGR amount takes a negative value, the combustion mode is switched to the spark ignition combustion mode. When the target internal EGR amount takes a negative value, the actual temperature of operating gases is higher than the target operating gas temperature, and due to the high temperature of operating gases, early ignition tends to occur. Therefore, by switching the combustion mode to the spark ignition combustion mode, it is possible to positively prevent occurrence of knocking which would occur if the compression ignition combustion mode was continued.

Further, according to this preferred embodiment, the external EGR amount is controlled by recirculating exhaust gases to the intake system. Further, the target total EGR amount with respect to the sum of the external EGR amount and the internal EGR amount is set according to the detected operating condition of the engine, and during the compression ignition mode, if the target internal EGR amount is larger than the target total EGR amount, the combustion mode is switched to the spark ignition combustion mode. When the target internal EGR amount is larger than the total EGR amount, if the set target internal EGR amount is used as it is, the internal EGR amount becomes excessive to causes shortage of fresh air supplied to the combustion chamber accordingly, which makes the combustion unstable. Therefore, in such a case, the combustion mode is switched to the spark ignition combustion mode, whereby it is possible to positively prevent occurrence of a misfire, which would occur if the compression ignition combustion mode was continued.

To attain the above object, in a second aspect of the present invention, there is provided a method of controlling an internal combustion engine which is operated while switching a combustion mode thereof between a compression ignition combustion mode in which an air-fuel mixture supplied to a combustion chamber is burned by compression ignition, and a spark ignition combustion mode in which the air-fuel mixture is burned by spark ignition, comprising an internal EGR control step of controlling an internal EGR amount of combustion gases caused to remain in the combustion chamber, a target operating gas temperature-setting step of setting a target operating gas temperature as a target to which the temperature of operating gases in the combustion chamber is to be controlled in the compression ignition combustion mode, a target internal EGR amount-setting step of setting a target internal EGR amount as a target to which the internal EGR amount is to be controlled, such that the temperature of operating gases in the combustion chamber becomes equal to the target operating gas temperature in the compression ignition combustion mode, and a combustion mode-switching step of switching the combustion mode to the spark ignition combustion mode depending on the target internal EGR amount.

With the configuration of the second aspect of the present invention, it is possible to obtain the same advantageous effects as provided by the first aspect of the present invention.

Preferably, the method further comprises an external EGR control step of controlling an external EGR amount of exhaust gases exhausted from the combustion chamber and caused to return to an intake system of the engine, an operating condition-detecting step of detecting an operating condition of the engine, and a target total EGR amount-setting step of setting a target total EGR amount serving as a target to which a total EGR amount as a sum of the internal EGR amount and the external EGR amount is to be controlled, according to the detected operating condition of the engine, wherein the combustion mode-switching step includes switching the combustion mode to the spark ignition combustion mode when the target internal EGR amount takes a negative value or is larger than the target total EGR amount.

With the configurations of the preferred embodiment, it is possible to obtain the same advantageous effects as provided by the preferred embodiment of the first aspect of the present invention.

The above and other objects, features, and advantages of the present invention will become more apparent from the following detailed description taken in conjunction with the accompanying drawings.

DETAILED DESCRIPTION OF PREFERRED EMBODIMENTS

Figure 1:
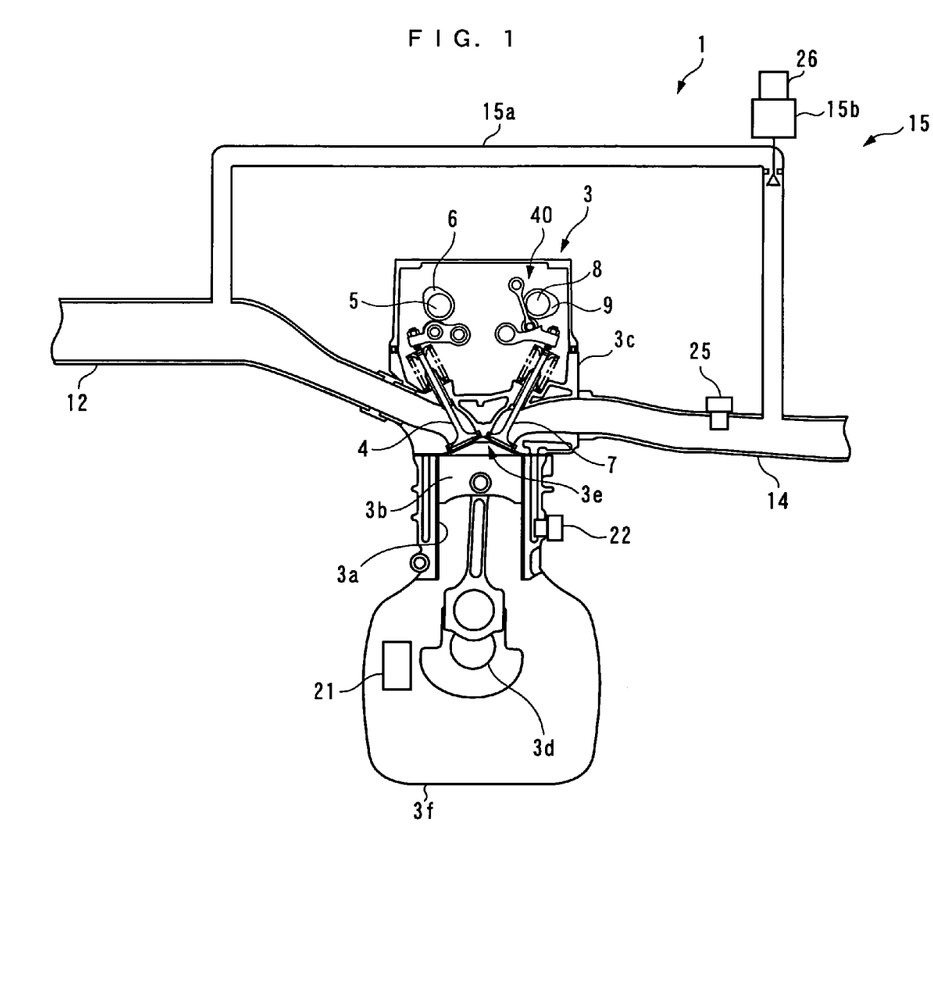
FIG. 1 is a schematic view of a control system according to the invention and an engine incorporating the same.

Hereafter, the invention will now be described in detail with reference to drawings showing preferred embodiments thereof. FIG. 1 schematically shows the arrangement of a control system 1, and an internal engine (hereinafter referred to as "the engine") 3 to which the internal EGR control system 1 is applied. The engine 3 is an inline four-cylinder gasoline engine installed on an automotive vehicle, not shown, and has four cylinders 3a (only one of which is shown). The engine 3 has a combustion chamber 3e defined between the piston 3b in each cylinder 3a and a cylinder head 3c.

The engine 3 includes a pair of intake valves 4 and 4 (only one of which is shown) and a pair of exhaust valves 7 and 7 (only one of which is shown), provided on a cylinder-by-cylinder basis. Further, the engine 3 includes an intake camshaft 5 on the intake side and intake cams 6 integrally formed with the intake camshaft 5, an exhaust camshaft 8 on the exhaust side and exhaust cams 9 integrally formed with the exhaust camshaft 8, fuel injection valves 10 (see FIG. 2), and spark plugs 11 (see FIG. 2), and an exhaust-side valve actuating mechanism 40 (internal EGR control means).

The crankshaft 3d of the engine 3 is provided with a crank angle sensor 21. The crank angle sensor 21 (operating condition-detecting means) delivers a pulse of an CRK signal to an ECU 2 whenever the crankshaft 3d rotates through a predetermined crank angle (e.g. 1°). The ECU 2 determines the rotational speed of the engine 3 (hereinafter referred to as "the engine speed") NE based on the CRK signal.

The intake camshaft 5 and the exhaust camshaft 8 are rotatably supported in the cylinder head 3c via respective holders, not shown, such that they extend in the direction of arrangement of the cylinders 3a. The intake camshaft 5 is connected to a crankshaft 3d by a timing chain, not shown. With this arrangement, the intake camshaft 5 rotates one turn per two turns of the crankshaft 3d, and the rotation of the intake cams 6 caused by the rotation of the intake camshaft 5 actuates the intake valves 4 to open and close.

Similarly, the exhaust camshaft 8 is connected to the crankshaft 3d by a timing chain, not shown, and rotates one turn per two turns of the crankshaft 3d. The rotation of the exhaust cams 9 caused by the rotation of the exhaust camshaft 8 actuates the exhaust valves 7 to open and close.

The fuel injection valves 10 are provided for the respective cylinders 3a, and are each mounted through an associated one of the cylinder heads 3c so as to inject fuel directly into the associated combustion cylinders 3a. Time over which each fuel injection valve 10 opens, and timing in which the same starts to open are controlled by a drive signal from the ECU 2, whereby the fuel injection amount and fuel injection timing are controlled.

The spark plugs 11 are also provided for the respective cylinders 3a, and are each mounted through an associated one of the cylinder heads 3c. Each of the spark plugs 11 has its discharge conditions controlled by the ECU 2, for burning a mixture within an associated one of the combustion chambers 3e in ignition timing. Further, the engine 3 performs spark ignition combustion (hereinafter referred to as "SI combustion") in which a mixture supplied into a combustion chamber 3e is ignited by a spark generated by the spark plug 11, and compression ignition combustion (hereinafter referred to as "CI combustion") in which the mixture is ignited by compression ignition, and the switching therebetween is executed by the ECU 2.

An engine coolant temperature sensor 22 is mounted in the cylinder block of the engine 3. The engine coolant temperature sensor 22 senses a temperature TW of engine coolant circulating through the cylinder block (not shown) of the engine 3, and delivers a signal indicative of the sensed engine coolant temperature TW to the ECU 2.

An intake air temperature sensor 23 and an intake pipe pressure sensor 24 are inserted into an intake pipe 12 (intake system) of the engine. The intake air temperature sensor 23 detects temperature (hereinafter referred to as "the intake air temperature") TA of air flowing through the intake pipe, and delivers a signal indicative of the detected intake air temperature TA to the ECU 2, and the intake pipe pressure sensor 24 detects pressure (hereinafter referred to as "the intake pipe pressure") PBA in the intake pipe 12 and delivers a signal indicative of the detected intake pipe pressure PBA to the ECU 2.

On the other hand, in the exhaust pipe 14 of the engine 3, there is provided an exhaust air temperature sensor 25. The exhaust air temperature sensor 25 detects the temperature (hereinafter referred to as "the exhaust temperature") of exhaust gases flowing through the exhaust pipe 14. A signal indicative of the detected exhaust temperature TEX is delivered to the ECU 2.

Further, the engine 3 is provided with an exhaust gas recirculation mechanism 15 (external EGR control means). The exhaust gas recirculation mechanism 15 recirculates part of exhaust gases in the exhaust pipe 14 into the intake pipe 12, and is comprised of an EGR pipe 15a connecting between the intake pipe 12 and the exhaust pipe 14, and an EGR control valve 15b for opening and closing the EGR pipe 15a.

The EGR control valve 15b is formed by a linear electromagnetic valve, and is configured such that the lift (hereinafter referred to as "the EGR lift") thereof is linearly changed between a maximum value and a minimum value according to an EGR lift control input U_LIFT, referred to hereinafter, from the ECU 2, whereby the opening of the EGR pipe 15a, i.e. the amount of exhaust recirculation (hereinafter referred to as "the external EGR amount") is controlled.

The EGR control valve 15b has an EGR lift sensor 26 attached thereto which detects an actual EGR lift of the EGR control valve 15b and delivers a signal indicative of the detected EGR lift to the ECU 2.

Further, the exhaust-side valve actuating mechanism 40 is formed by a variable cam phase mechanism 50 and a variable valve lift mechanism 70.

Figure 3:
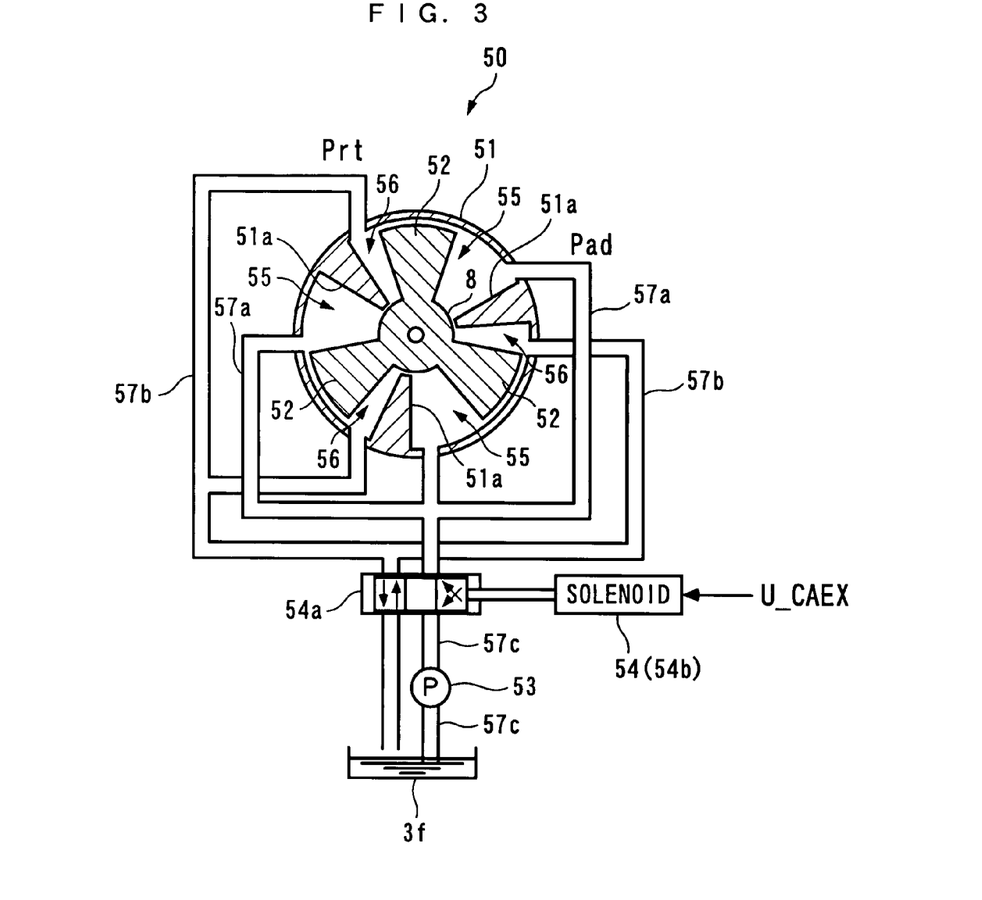
FIG. 3 is a schematic view of a variable cam phase mechanism.

The variable cam phase mechanism 50 continuously changes a relative phase of the exhaust camshaft 8 with respect to the crankshaft 3d (hereinafter referred to as "the exhaust cam phase") within a predetermined range, and is provided at the one end of the exhaust camshaft 8 where an exhaust sprocket is mounted. As shown in FIG. 3, the variable cam phase mechanism 50 includes a housing 51, a three-bladed vane 52, an oil pressure pump 53, and a solenoid valve 54.

The housing 51 is integrally formed with the exhaust sprocket on the exhaust camshaft 8, and is divided by three partition walls 51a formed at equal circumferential intervals. The vane 52 is coaxially mounted on the end of the exhaust camshaft 8 where the exhaust sprocket is mounted, such that the blades of the vane 52 radially extend outward from the exhaust camshaft 8, and are rotatably housed in the housing 51. Further, the housing 51 has three advance chambers 55 and three retard chambers 56 each formed between one of the partition walls 51a and one of the three blades of the vane 52.

The oil pressure pump 53 is a mechanical one connected to the crankshaft 3d. As the crankshaft 3d rotates, the oil pressure pump 53 draws lubricating oil stored in an oil pan 3f of the engine 3 via a lower part of an oil passage 57c, pressurizes the same, and then supplies the pressurized oil to the solenoid valve 54 via the remaining part of the oil passage 57c.

The solenoid valve 54 is formed by combining a spool valve mechanism 54a and a solenoid 54b, and is connected to the advance chambers 55 and retard chambers 56 via an advance oil passage 57a and a retard oil passage 57b so as to control oil pressure Poil supplied from the oil pressure pump 53 and deliver the same to the advance chambers 55 and the retard chambers 56 as advance oil pressure Pad and retard oil pressure Prt. The solenoid 54b of the solenoid valve 54 is responsive to a phase control input U_CAEX, referred to hereinafter, from the ECU 2, for moving a spool valve element of the spool valve mechanism 54a within a predetermined range of motion to thereby change both the advance oil pressure Pad and the retard oil pressure Prt.

Figure 4:
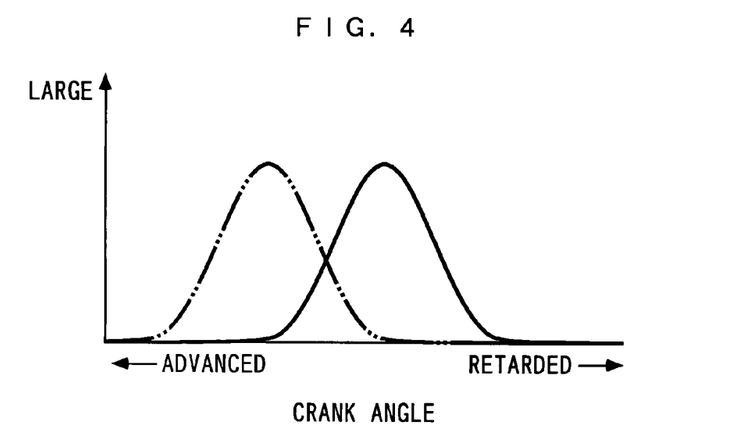
FIG. 4 is a diagram of valve lift curves of an exhaust valve depicted in respective cases where the variable cam phase mechanism sets an exhaust cam phase to a most retarded value (solid line) and a most advanced value (two dot-chain line)

In the variable cam phase mechanism 50 configured as above, during operation of the oil pressure pump 53, the solenoid valve 54 is operated according to the phase control input U_CAEX, to supply the advance oil pressure Pad to the advance chambers 55 and the retard oil pressure Prt to the retard chambers 56, whereby the relative phase of the vane 52 with respect to the housing 51 is changed toward an advanced side or a retarded side. As a result, the aforementioned exhaust cam phase is continuously changed between a predetermined most retarded value and a predetermined most advanced value, whereby the valve timing of the exhaust valves 7 is continuously changed between most retarded timing indicated by a solid line in FIG. 4 and most advanced timing indicated by a two-dot chain line in FIG. 4.

A cam angle sensor 27 (see FIG. 2) is disposed at the other end of the exhaust camshaft 8, opposite to the end where the variable cam phase mechanism 50 is disposed. The cam angle sensor 27 delivers an EXCAM signal, which is a pulse signal, to the ECU 2 along with rotation of the exhaust camshaft 8. Each pulse of the EXCAM signal is generated whenever the exhaust camshaft 8 rotates through a predetermined cam angle (e.g. 1°), and the ECU 2 calculates an exhaust cam phase CAEX based on the EXCAM signal and the aforementioned CRK signal.

Figure 5:
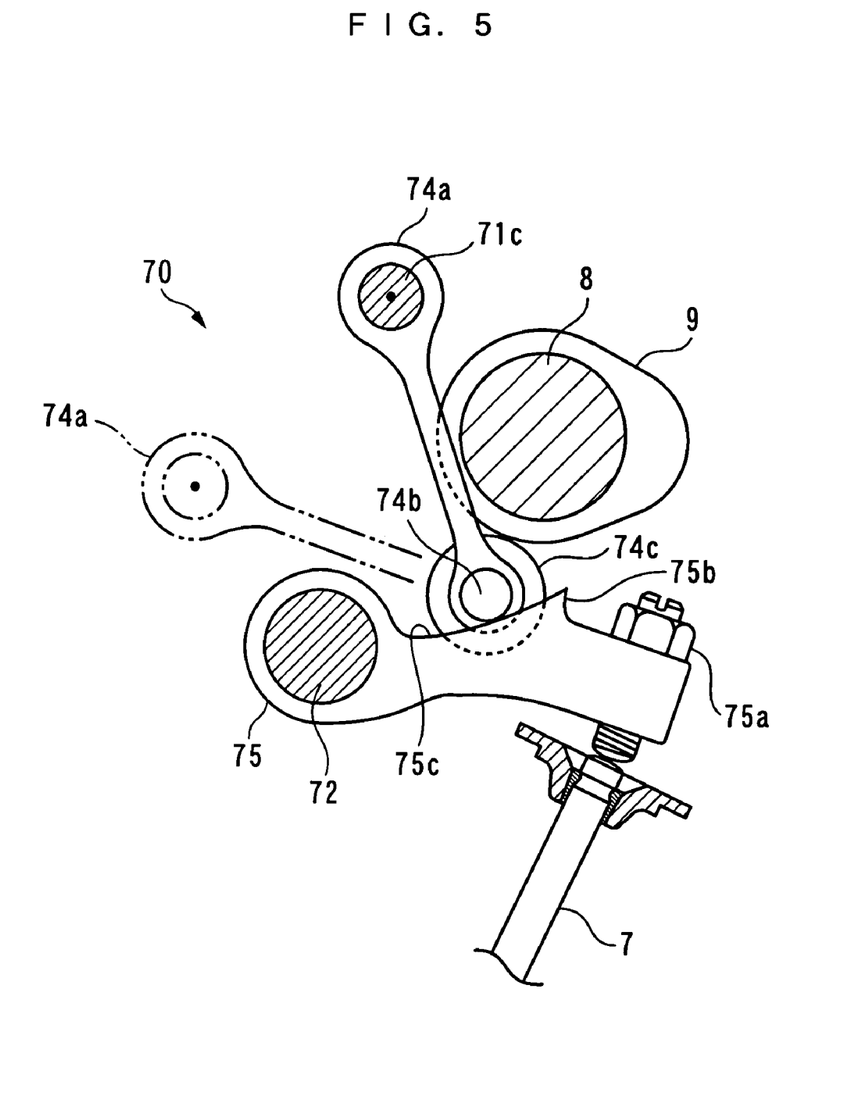
FIG. 5 is a schematic view of a variable valve lift mechanism.
Figure 6:
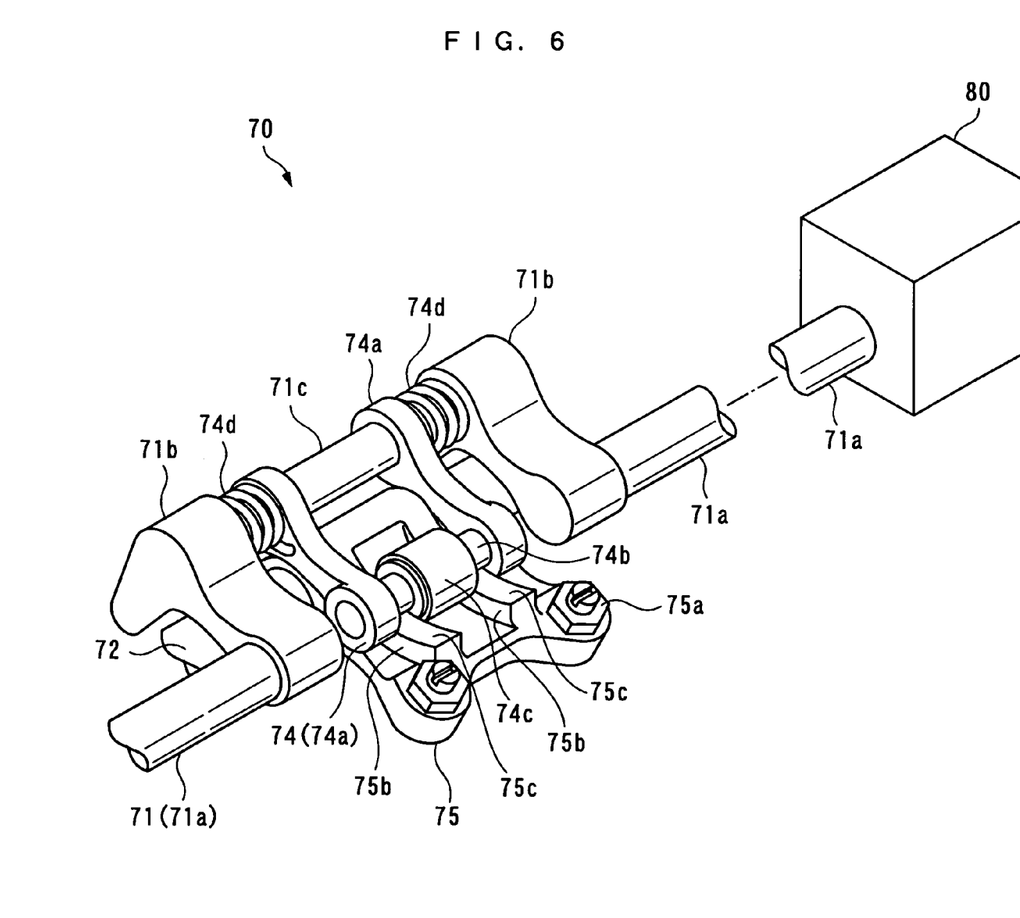
FIG. 6 is a fragmentary perspective view of the variable valve lift mechanism.

Further, the valve lift mechanism 70 continuously changes the lift of the exhaust valves 7 (hereinafter referred to as "the exhaust valve lift") between a value of 0 and a predetermined maximum value. As shown in FIGS. 5 and 6, the variable valve lift mechanism 70 is comprised of a control shaft 71 and a rocker arm shaft 72, upper and lower rocker arms 74 and 75 fitted on theses shafts 71 and 72, for each cylinder 3a, and an actuator 80 for actuating the upper and lower rocker arms 74 and 75. It should be noted that in the present embodiment, the exhaust valve lift represents the maximum lift (lift amount) of the exhaust valves 7.

The control shaft 71 is comprised of pivot parts 71a, holder parts 71b, and eccentric shaft parts 71c, which are assembled into a unit. The control shaft 71 extends parallel with the exhaust camshaft 8, and is rotatably supported by the cylinder heads 3c, with one end of the unit connected to the actuator 80.

The upper rocker arm 74 is comprised of a pair of links 74a and 74a, a roller shaft 74b, a roller 74c, and a pair of coil springs 74d and 74d. The roller shaft 74b has opposite ends thereof rotatably supported by respective one ends of the links 74a and 74a, respectively. The roller 74c is rotatably fitted on the roller shaft 74b.

The other ends of the respective links 74a are pivotally fitted on the eccentric shaft part 71c of the control shaft 71, and are each connected to an associated one of the holder parts 71b via an associated one of the coil springs 74d. The roller 74c is brought into contact with the cam surface of the exhaust cam 9 by the urging forces of the respective coil springs 74d acting on the links 74a, respectively. Further, when the roller 74c is in contact with the circular base part of the cam surface of the exhaust cam 9, the roller shaft 74b is held in its original position (i.e. the position shown in FIG. 5) where the axis of the roller shaft 74b is aligned with the axis of the pivot part 71a.

The lower rocker arm 75 is configured such that one end thereof is pivotally supported by the rocker arm shaft 72, and the other end thereof has adjusting bolts 75a and 75a inserted therethrough. Between the adjusting bolts 75a and the respective associated exhaust valves 7, there is provided a predetermined tappet clearance.

Further, the lower rocker arm 75 has a pair of guide parts 75b and 75b projecting upward. Each of the guide parts 75b has an upper surface thereof formed as a guide surface 75c for guiding the roller shaft 74b of the upper rocker arm 74, and is held in contact with the roller shaft 74b via the guide surface 75c. The guide surface 75c has an arcuate shape which protrudes downward and is concentric with the eccentric shaft part 71c, i.e. coincides with the arc drawn about the axis of the eccentric shaft part 71c when the links 74a are in the valve-closing position indicated by solid lines in FIG. 5. In the state where the guide parts 75b are in contact with the roller shaft 74b, the roller 74c is positioned between the guide parts 75b and 75b, and is held in contact only with the exhaust cam 9 without being brought into contact with the lower rocker arm 75.

The actuator 80 is implemented by a combination of a motor, not shown, and a reduction gear mechanism, not shown. When driven by the ECU 2, the actuator 80 causes the control shaft 71 to pivotally move about the axis of the pivot parts 71a. As the control shaft 71 pivotally moves, the links 74a pivotally move about the roller shaft 74b.

Next, a description will be given of the operation of the variable valve lift mechanism 70 configured as above. In the variable valve lift mechanism 70, when the actuator 80 is driven by a lift control input U_SAAEX, referred to hereinafter, from the ECU 2, the control shaft 71 starts pivotal motion. When the control shaft 71 is thus pivotally moved, a turning angle SAAEX of the control shaft 71 is limited within a predetermined range, whereby e.g. when the roller shaft 74b is in the aforementioned original position, the turning range of the links 74a is also limited between the zero lift position indicated by the solid line in FIG. 5 and a maximum lift position indicated by a two-dot chain line in FIG. 5.

When the links 74a are in the zero lift position, if the exhaust cam 9 rotates to push the roller 74c by the cam nose thereof toward the rocker arm shaft 72, the links 74a pivotally move clockwise, as viewed in FIG. 5, about the eccentric shaft part 71c. In this case, since the guide surfaces 75c of the lower rocker arm 75 each have the shape which coincides with the arc drawn about the axis of the eccentric shaft part 71c, as described hereinabove, the lower rocker arm 75 is held in the valve-closing position shown in FIG. 5. This holds the exhaust valve lift at a value of 0, whereby the exhaust valves 7 are held in the closed state.

On the other hand, when the links 74a have been pivotally moved from the zero lift position to a position toward the maximum lift position, the rotation of the exhaust cam 9 causes the links 74a to pivotally move clockwise, as viewed in FIG. 5, about the eccentric shaft part 71c, whereby the lower rocker arm 75 is caused to pivotally move downward from the valve-closing position in FIG. 5 to open the exhaust valves 7. In this case, the amount of pivotal motion of the lower rocker arm 75, i.e. the exhaust valve lift, becomes larger as the links 74a are in a position closer to the maximum lift position.

Figure 7:
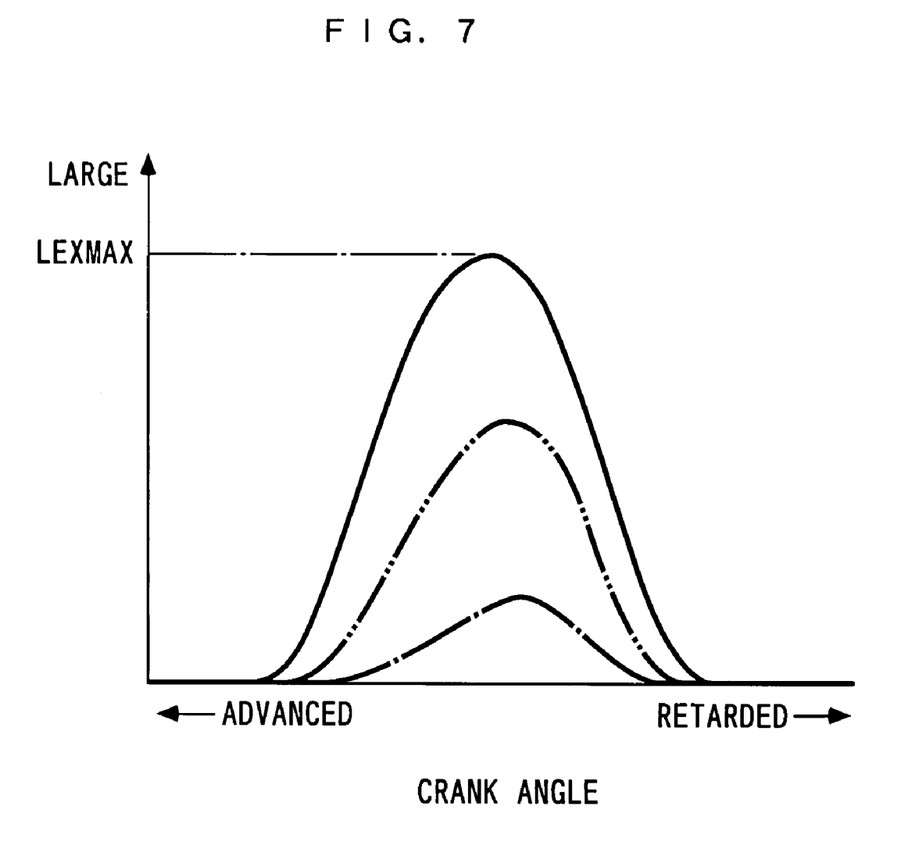
FIG. 7 is a view of a state of the exhaust valve lift changed by the variable valve lift mechanism.

As described above, the exhaust valves 7 open with a larger lift as the links 74a are in a position closer to the maximum lift position. More specifically, during rotation of the exhaust cam 9, when the links 74a are in the maximum lift position, the exhaust valves 7 open in accordance with a valve lift curve indicated by a solid line in FIG. 7, and the exhaust valve lift shows its maximum value LEXMAX. Therefore, the variable valve lift mechanism 70 is capable of pivotally moving the links 74a between the zero lift position and the maximum lift position by the actuator 80 to thereby continuously change the exhaust valve lift between a value of 0 and the predetermined maximum value LEXMAX. Further, when the exhaust cam phase CAEX remains the same, as the exhaust valve lift is larger, the valve-opening timing of the exhaust valves 7 becomes earlier, and the valve-closing timing of the same becomes later.

Figure 2:
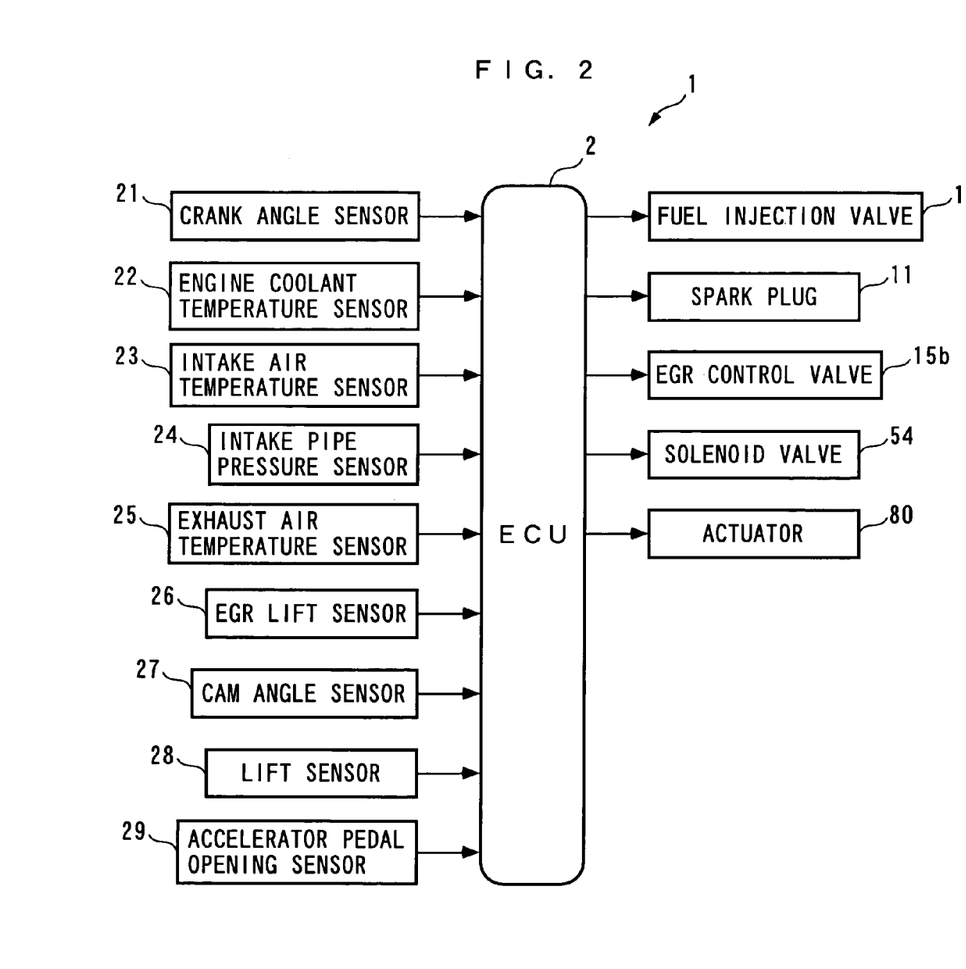
FIG. 2 is a view of part of the control system.

Further, the variable valve lift mechanism 70 is provided with a lift sensor 28 for detecting the exhaust valve lift (see FIG. 2). This lift sensor 28 detects the turning angle SAAEX of the control shaft 71, and delivers a signal indicative of the detected turning angle SAAEX to the ECU 2. As described above, the exhaust valve lift is unconditionally determined by the turning angle SAAEX of the control shaft 71, and hence the detected turning angle SAAEX represents the actual exhaust valve lift.

As described above, in the engine 3, the exhaust-side valve actuating mechanism 40 is capable of continuously changing the valve timing and valve lift, and hence the amount of combustion gases remaining in the combustion chamber 3e after the combustion stroke (hereinafter referred to as "the internal EGR amount") can be varied as desired. For example, the internal EGR amount assumes a value of 0 when the exhaust cam phase CAEX is in the most retarded angle position, and the exhaust valve lift is at the maximum value LEXMAX. On the other hand, as the exhaust cam phase CAEX is more advanced, the valve-closing timing of the exhaust valves 7 becomes earlier, and hence the internal EGR amount becomes larger. Further, as the exhaust valve lift is smaller, the amount of exhausted combustion gases becomes smaller, and hence the internal EGR amount becomes larger. As is clear from the above, in the present embodiment, each exhaust valve 7 is caused to close before the associated intake valve 4 starts to open, to thereby cause the high-temperature exhausted combustion gases to remain in the combustion chamber 3e to thereby obtain the internal EGR.

Further, a detection signal indicative of a sensed stepped-on amount AP of an accelerator pedal, not shown, of the vehicle (hereinafter referred to as "the accelerator opening degree AP") is delivered to the ECU 2 from an accelerator opening sensor 29 (operating condition-detecting means).

The ECU 2 is formed by a micro computer comprised of an I/O interface, a CPU, a RAM, and a ROM. The ECU 2 carries out control of the engine 3, including control of the fuel injection amount, based on control programs stored in the ROM according to the signals from the aforementioned various sensors 21 to 29. Further, the ECU 2 determines the combustion mode of the engine 3 to be the SI combustion mode or the CI combustion mode, and according to the determined combustion mode, the internal EGR amount and the external EGR amount are controlled. Further, when the engine 3 is in the CI combustion mode, depending on a target internal EGR amount EGRINCMD, referred to hereinafter, the combustion mode is switched to the SI combustion mode. Further, in the present embodiment, the ECU 2 corresponds to internal EGR control means, target operating gas temperature-setting means, target internal EGR amount-setting means, combustion mode-switching means, external EGR control means, operating condition-detecting means, and target total EGR amount-setting means.

Figure 8:
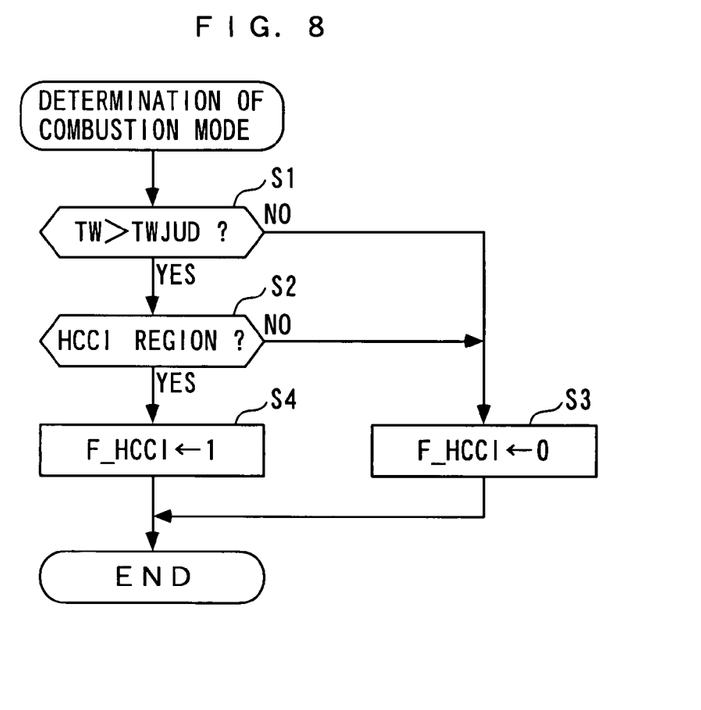
FIG. 8 is a flowchart showing a process for determining a combustion mode.

FIG. 8 is a flowchart showing a process for determining a combustion mode, which is executed by the ECU 2. This process is executed whenever a predetermined time period elapses. First, in a step 1 (shown as "S1" in abbreviated form in FIG. 8; the following steps are also shown in abbreviated form), it is determined whether or not the engine temperature TW is higher than a predetermined temperature TWJUD. If the answer to this question is negative (NO), i.e. if the engine temperature TW is not higher than the predetermined temperature TWJUD, it is judged that it is impossible to secure temperature in the combustion chamber 3e suitable for performing the CI combustion, so that the combustion mode is determined that it should be set to the SI combustion mode, and a CI combustion mode flag F_HCCI is set to 0 (step 3), followed by terminating the present process.

Figure 9:
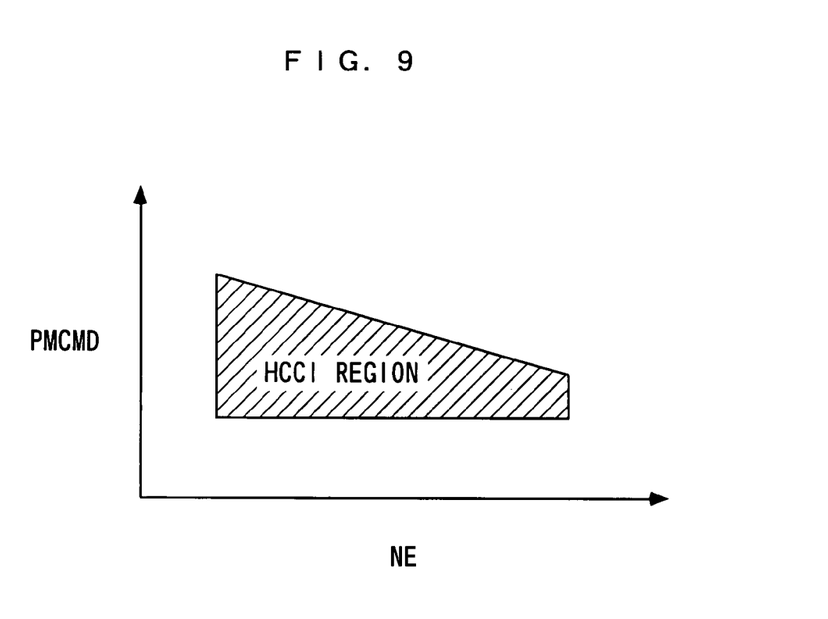
FIG. 9 is a view of an example of a combustion region map for use in the FIG. 8 process.

On the other hand, if the answer to the question of the step 1 is affirmative (YES), it is determined whether or not the engine 3 is in an operating region (hereinafter referred to as "the HCCI region") in which the CI combustion should be executed (step 2). This determination is executed by searching a combustion region map shown in FIG. 9, according to the engine speed NE and demanded torque PMCMD. The HCCI region of the combustion region map corresponds to an operating region in which the engine speed NE is in a low-to-medium speed region, and at the same time, the demanded torque PMCMD is in a low-to-medium load region. It should be noted that the demanded torque PMCMD is calculated according to the engine speed NE and the accelerator opening AP.

If the answer to the question of the step 2 is negative (NO), i.e. if the engine 3 is not in the HCCI region, the step 3 is executed to select the SI combustion mode, whereas if both the answers to the questions 1 and 2 are affirmative (YES), i.e. if the engine temperature TW is higher than the predetermined temperature TWJUD, and at the same time, the engine 3 is in the HCCI region, the combustion mode is determined to be set to the CI mode, and hence the CI combustion mode flag F_HCCI is set to 1 (step 4), followed by terminating the present process.

Figure 10:
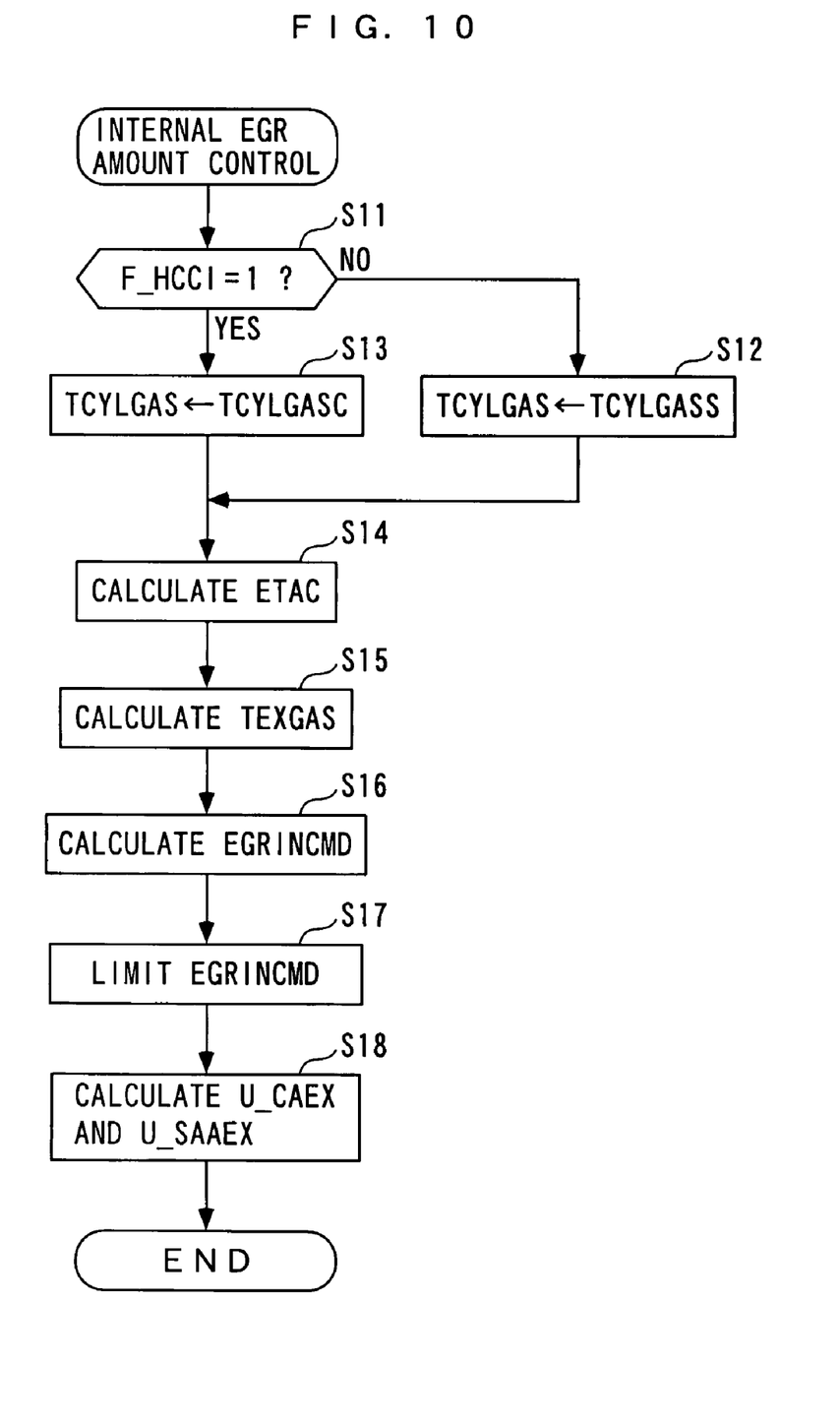
FIG. 10 is a flowchart showing a process for controlling the internal EGR amount.

FIG. 10 is a flowchart showing a process for controlling the internal EGR amount. In this process, first, in a step 11, it is determined whether or not the CI combustion mode flag F_HCCI is equal to 1. If the answer to this question is negative (NO), i.e. if the combustion mode is the SI combustion mode, a SI combustion-time map value TCYLGASS is calculated by searching a predetermined map (not shown) according to the engine speed NE and the demanded torque PMCMD, and a target operating gas temperature TCYLGAS is set to the calculated map value TCYLGASS (step 12).

On the other hand, if the answer to the question of the step 11 is affirmative (YES), i.e. if the combustion mode is the CI combustion mode, a CI combustion-time map value TCYLGASC is calculated by searching a predetermined map (not shown) according to the engine speed NE and the demanded torque PMCMD, and the target operating gas temperature TCYLGAS is set to the calculated map value TCYLGASC (step 13). In this map, the map value TCYLGASC is set to a value for controlling the temperature of operating gases at the start of the compression stroke to a temperature suitable for compression ignition, and the map is configured such that as the engine speed NE is lower, and as the demanded torque PMCMD is smaller, the map value TCYLGASC is set to a larger value. This is because as the engine speed NE is lower, the time interval between combustion cycles is longer, so that compression ignition is harder to occur, and as the demanded torque PMCMD is smaller, the fuel injection amount is smaller, so that compression ignition is harder to occur, and hence it is necessary to raise the temperature of operating gases to a higher temperature so as to make compression ignition easier to occur.

In a step 14 following the step 12 or 13, a target charging efficiency ETAC is calculated by searching a predetermined map (not shown) according to the target operating gas temperature TCYLGAS and the intake pipe pressure PBA. The target charging efficiency ETAC is a target value of the charging efficiency of operating gases (ratio of the amount of charged operating gases to the sum of the volume of the combustion chamber 3e and the piston displacement).

Next, the present combustion gas temperature TEXGAS is calculated by the following equation (1) (step 15):

$$TEXGAS = TEXGAST*(1-TDTGAS) + TEXGASZ*TDTGAS \quad (1)$$

wherein TEXGAST represents a combustion gas temperature calculated depending on operating conditions of the engine 3, and more particularly, when the combustion mode is the SI combustion mode, it is calculated according to the intake air temperature TA and the demanded torque PMCMD, and when the combustion mode is the CI combustion mode, it is calculated according to the target operating gas temperature TCYLGAS and the demanded torque PMCMD. Further, TEXGASZ represents the immediately preceding value of the combustion gas temperature calculated by the equation (1), and TDTGAS is an averaging coefficient which is set to a value smaller than 1.0.

Next, a target internal EGR amount EGRINCMD is calculated using the target operating gas temperature TCYLGAS, the target charging efficiency ETAC, the immediately preceding value TEXGASZ of the combustion gas temperature, and the intake air temperature TA, by the following equation (2) (step 16):

$$EGRINCMD=ETAC*NTCYLMAX*(TCYLGAS-TA)/(TEXGASZ-TA) \qquad (2)$$

Here, NTCYLMAX on the right side represents a maximum charging amount, which is the sum of the volume of the combustion chamber 3e and the piston displacement. Further, (TCYLGAS–TA) represents the difference between the target operating gas temperature and the temperature of fresh air drawn into the combustion chamber 3e, while (TEXGASZ–TA) represents the difference between the temperature of combustion gases and that of fresh air. Therefore, the ratio (TCYLGAS–TA)/(TEXGASZ–TA) between the two represents a ratio of a rise in the temperature of operating gases, which should be caused by the internal EGR, to a rise in the temperature of operating gases, which can be caused by the internal EGR. Therefore, by multiplying the ratio by ETAC*NTCYLMAX, the target internal EGR amount EGRINCMD can be properly calculated.

Next, a limiting process is carried out on the target internal EGR amount EGRINCMD (step 17). In this limiting process, when the calculated target internal EGR amount EGRINCMD is smaller than 0, i.e. when it is a negative value, it is set to 0.

Next, a phase control input U_CAEX and a lift control input U_SAAEX are calculated according to the target internal EGR amount EGRINCMD, the engine speed NE, and the demanded torque PMCMD (step 18), followed by terminating the present process. Then, the electromagnetic valve 54 of the variable cam phase mechanism 50 is driven according to the phase control input U_CAEX, and the actuator 80 of the variable valve lift mechanism 70 is driven according to the lift control input U_SAAEX, whereby the internal EGR amount is controlled such that it becomes equal to the target internal EGR amount EGRINCMD, and the temperature of operating gases in the combustion chamber 3e is controlled such that it becomes equal to the target operating gas temperature TCYLGAS.

Figure 11:
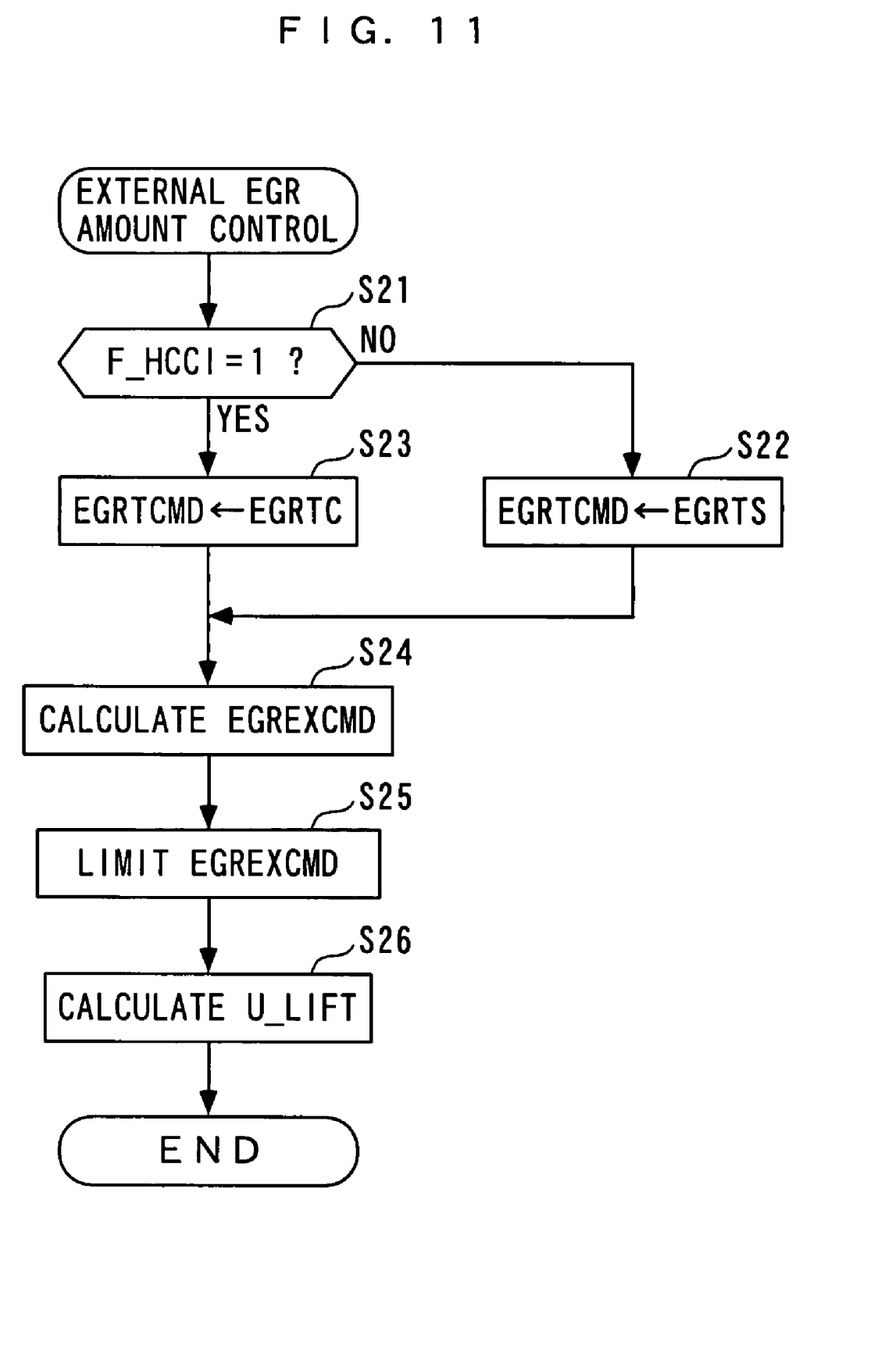
FIG. 11 is a flowchart showing a process for controlling the external EGR amount.

FIG. 11 is a flowchart showing a process for controlling the external EGR amount. In this process, first, in a step 21, it is determined whether or not the CI combustion mode flag F_HCCI is equal to 1. If the answer to this question is negative (NO), a SI combustion-time map value EGRTS is calculated by searching a predetermined map (not shown) according to the engine rotational speed NE and the demanded torque PMCMD, and a target total EGR amount EGRTCMD is set to the calculated map value EGRTS (step 22). The target total EGR amount EGRTCMD is a target value of the total EGR amount which is the sum of the internal EGR amount and the external EGR amount.

On the other hand, if the answer to the question of the step 21 is affirmative (YES), i.e. if the combustion mode is the CI combustion mode, a CI combustion-time map value EGRTC is calculated by searching a predetermined map (not shown) according to the engine rotational speed NE and the demanded torque PMCMD, and the target total EGR amount EGRTCMD is set to the calculated map value EGRTC (step 23).

In a step 24 following the step 22 or the step 23, the target internal EGR amount EGRINCMD calculated in the step 16 in FIG. 10 is subtracted from the target total EGR amount EGRTCMD (=EGRTCMD–EGRINCMD), thereby calculating the target external EGR amount EGREXCMD.

Next, a limiting process is carried out on the target external EGR amount EGREXCMD (step 25). In this limiting process, if the calculated target external EGR amount EGREXCMD is a negative value, it is set to 0.

Next, an EGR lift control input U_LIFT is calculated according to the calculated target external EGR amount EGREXCMD and the engine speed NE (step 26), followed by terminating the present process. Then, by driving the EGR control valve 15b according to the EGR lift control input U_LIFT, the external EGR amount is controlled such that it becomes equal to the target external EGR amount EGREXCMD.

Figure 12:
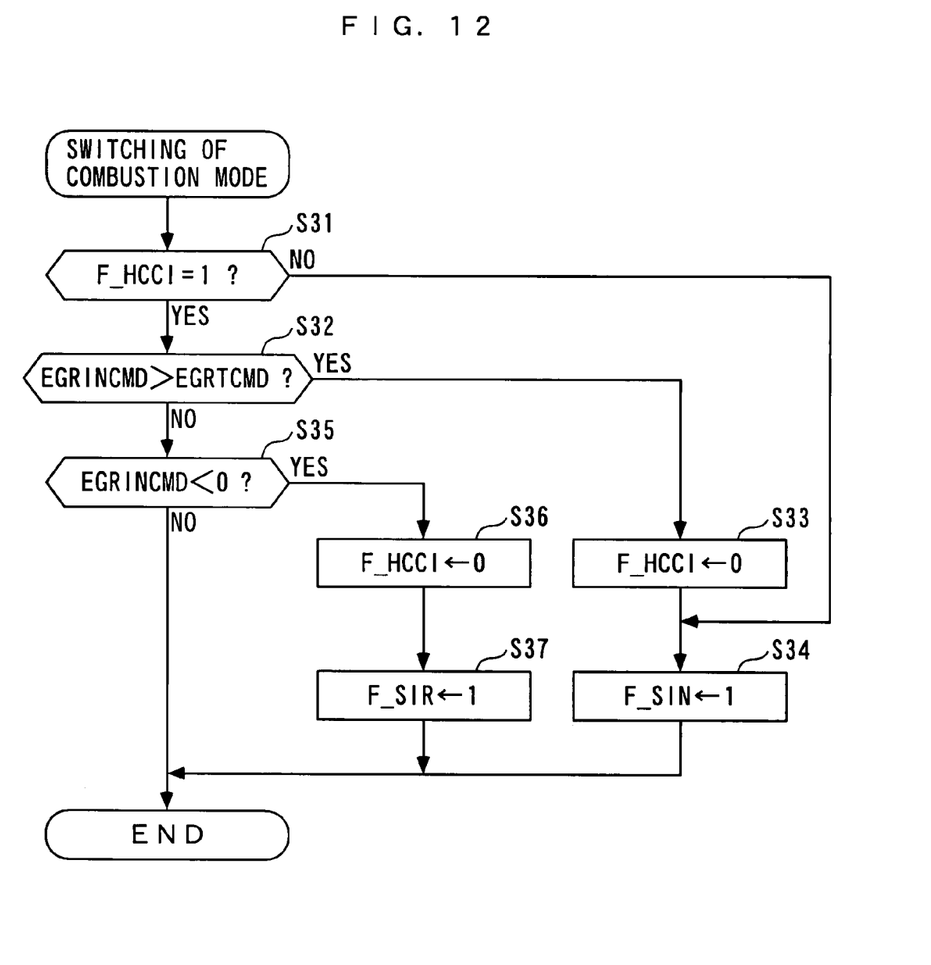
FIG. 12 is a flowchart showing a process for switching a combustion mode.

FIG. 12 is a flowchart showing a process for switching the combustion mode. In this process, first, in a step 31, it is determined whether or not the CI combustion mode flag F_HCCI set by the FIG. 8 process is equal to 1. If the answer to this question is negative (NO), the combustion mode is determined to be set to a normal SI combustion mode, and to indicate the fact, a normal SI combustion flag S_SIN is set to 1 (step 34), followed by terminating the present process. In the normal SI combustion mode, the ignition timing and fuel injection timing are set according to the engine speed NE and the demanded torque PMCMD.

On the other hand, if the answer to the question of the step S31 is affirmative (YES), i.e. if the engine is in the CI combustion mode, it is determined whether or not the target internal EGR amount EGRINCMD is larger than the target total EGR amount EGRTCMD (step 32). If the answer to this question is affirmative (YES), i.e. if EGRINCMD>EGRTCMD holds, it is judged that if the target internal EGR amount EGRINCMD is directly used, the internal EGR amount can become excessive to cause shortage of fresh air to be supplied to the combustion chamber 3e, which can undesirably make the combustion unstable. Therefore, the CI combustion mode flag F_HCCI is set to 0 (step 33) to switch the combustion mode to the SI combustion mode, and the step 34 is executed to select the normal SI combustion mode.

On the other hand, if the answer to the question of the step S32 is negative (NO), it is determined whether or not the target internal EGR amount EGRINCMD before the limiting process is smaller than 0 (step 35). If the answer to this question is affirmative (YES), i.e. if the calculated target internal EGR amount EGRINCMD takes a negative value, it is judged that the intake air temperature TS is higher than the target operating gas temperature TCYLGAS, which means that the temperature of operating gases has been already too high, and hence early ignition can be caused. Therefore, the CI combustion mode flag F_HCCI is set to 0 (step 36) and the combustion mode is switched to the SI combustion mode. Then, a retard SI combustion mode is selected as the SI combustion mode, and to indicate this fact, a retard SI combustion flag F_SIR is set to 1 (step 37), followed by terminating the present process. In the retard SI combustion mode, the ignition timing and the fuel injection timing are set to be more retarded than in the normal SI combustion mode.

On the other hand, if both the answers to the questions of the steps 32 and 35 are negative (NO), i.e. if the target internal EGR amount EGRINCMD is not smaller than 0, and at the same time, not larger than the target total EGR amount EGRTCMD, the present process is immediately terminated to continue the CI combustion mode.

As described above, according to the present embodiment, during the CI combustion mode, the target operating gas temperature TCYLGAS is calculated as a temperature suitable for the CI combustion, and the target internal EGR amount EGRINCMD is calculated such that the temperature of operating gases in the combustion chamber 3e becomes equal to the target operating gas temperature TCYLGAS. Then, when the target internal EGR amount EGRINCMD takes a negative value, the combustion mode is switched to the SI combustion mode. Therefore, when the intake air temperature TA is higher than the target operating gas temperature TCYLGAS, which implies that the temperature of operating gases is already too high with a possibility of causing early ignition, it is possible to switch the combustion mode to the SI combustion mode in an appropriate manner, whereby it is possible to positively prevent occurrence of knocking which would be caused if the CI combustion mode was continued.

Further, in this case, as the SI combustion mode, there is selected the retard SI combustion mode in which the ignition timing and the fuel injection timing are retarded, which makes it possible to effectively lower the temperature of operating gases, whereby it is possible to prevent early ignition from occurring in the SI combustion to which the combustion mode is switched.

Further, when the target internal EGR amount EGRINCMD is larger than the target total EGR amount EGRTCMD calculated according to the engine speed NE and the demanded torque PMCMD, the combustion mode is switched to the SI combustion mode. Therefore, when the internal EGR amount becomes excessive, which can accordingly cause shortage of fresh air to make the combustion unstable, it is possible to switch the combustion mode to the SI combustion mode in an appropriate manner, whereby it is possible to positively prevent occurrence of a misfire which would be caused if the CI combustion was continued.

It should be noted that the present invention is by no means limited to the embodiment described above, but can be practices in various forms. For example, although in the present embodiment, as parameters for setting the target operating gas temperature, the engine speed and the demanded torque are used, this is not limitative but any other suitable parameter may be used insofar as it represents readiness of occurrence of compression ignition. Further, although in the present embodiment, the combustion temperature used as a parameter for calculating the target internal EGR amount is determined by estimation, the temperature of exhaust gases may be directly detected by an exhaust gas temperature sensor. Further, although in the present embodiment, the internal EGR amount is controlled by both of the variable cam phase mechanism and the variable valve lift mechanism, this is not limitative, but for example, the internal EGR amount may be controlled by one of the two variable mechanisms. Alternatively, in place of the above or in combination with the above, the internal EGR amount may be controlled by retardation of opening timing of the intake valves.

It is further understood by those skilled in the art that the foregoing are preferred embodiments of the invention, and that various changes and modifications may be made without departing from the spirit and scope thereof.

What is claimed is:

1. A control system for an internal combustion engine which is operated while switching a combustion mode thereof between a compression ignition combustion mode in which an air-fuel mixture supplied to a combustion chamber is burned by compression ignition, and a spark ignition combustion mode in which the air-fuel mixture is burned by spark ignition, comprising:

internal EGR control means for controlling an internal EGR amount of combustion gases caused to remain in the combustion chamber;

target operating gas temperature-setting means for setting a target operating gas temperature as a target to which the temperature of operating gases in the combustion chamber is to be controlled in the compression ignition combustion mode;

target internal EGR amount-setting means for setting a target internal EGR amount as a target to which the internal EGR amount is to be controlled, such that the temperature of operating gases in the combustion chamber becomes equal to the target operating gas temperature in the compression ignition combustion mode; and combustion mode-switching means for switching the combustion mode to the spark ignition combustion mode depending on the target internal EGR amount.

2. A control system as claimed in claim 1, further comprising:

external EGR control means for controlling an external EGR amount of exhaust gases exhausted from the combustion chamber and caused to return to an intake system of the engine;

operating condition-detecting means for detecting an operating condition of the engine; and target total EGR amount-setting means for setting a target total EGR amount serving as a target to which a total EGR amount as a sum of the internal EGR amount and the external EGR amount is to be controlled, according to the detected operating condition of the engine, wherein said combustion mode-switching means switches the combustion mode to the spark ignition combustion mode when the target internal EGR amount takes a negative value or is larger than the target total EGR amount.

3. A method of controlling an internal combustion engine which is operated while switching a combustion mode thereof between a compression ignition combustion mode in which an air-fuel mixture supplied to a combustion chamber is burned by compression ignition, and a spark ignition combustion mode in which the air-fuel mixture is burned by spark ignition, comprising:

an internal EGR control step of controlling an internal EGR amount of combustion gases caused to remain in the combustion chamber;

a target operating gas temperature-setting step of setting a target operating gas temperature as a target to which the temperature of operating gases in the combustion chamber is to be controlled in the compression ignition combustion mode;

a target internal EGR amount-setting step of setting a target internal EGR amount as a target to which the internal EGR amount is to be controlled, such that the temperature of operating gases in the combustion chamber becomes equal to the target operating gas temperature in the compression ignition combustion mode; and a combustion mode-switching step of switching the combustion mode to the spark ignition combustion mode depending on the target internal EGR amount.

4. A method as claimed in claim 3, further comprising:
an external EGR control step of controlling an external EGR amount of exhaust gases exhausted from the combustion chamber and caused to return to an intake system of the engine;
an operating condition-detecting step of detecting an operating condition of the engine; and
a target total EGR amount-setting step of setting a target total EGR amount serving as a target to which a total EGR amount as a sum of the internal EGR amount and the external EGR amount is to be controlled, according to the detected operating condition of the engine,
wherein said combustion mode-switching step includes switching the combustion mode to the spark ignition combustion mode when the target internal EGR amount takes a negative value or is larger than the target total EGR amount.

* * * * *